(12) United States Patent
Sun et al.

(10) Patent No.: US 11,285,413 B2
(45) Date of Patent: Mar. 29, 2022

(54) MANIFOLD ASSEMBLY AND METHOD OF USE

(71) Applicant: Pall Corporation, Port Washington, NY (US)

(72) Inventors: Peng Sun, Zouping (CN); Xiangyang Zhong, Beijing (CN); Liang Zhou, Beijing (CN)

(73) Assignee: PALL CORPORATION, Port Washington, NY (US)

( * ) Notice: Subject to any disclaimer, the term of this patent is extended or adjusted under 35 U.S.C. 154(b) by 128 days.

(21) Appl. No.: 16/901,367

(22) Filed: Jun. 15, 2020

(65) Prior Publication Data

US 2021/0379512 A1  Dec. 9, 2021

(30) Foreign Application Priority Data

Jun. 8, 2020 (CN) .......................... 202010512864.7

(51) Int. Cl.
*B01D 35/30* (2006.01)

(52) U.S. Cl.
CPC ........ *B01D 35/30* (2013.01); *B01D 2201/302* (2013.01); *B01D 2201/4015* (2013.01); *B01D 2201/4023* (2013.01); *B01D 2201/4076* (2013.01)

(58) Field of Classification Search
CPC .............. B01D 35/30; B01D 2201/302; B01D 2201/4015; B01D 2201/4023; B01D 2201/4076; B01D 2201/30; B01D 2201/40; B01D 2201/301

USPC ......................... 210/234–238, 440–444, 455
See application file for complete search history.

(56) References Cited

U.S. PATENT DOCUMENTS

| 9,044,699 | B2 | 6/2015 | Gale et al. | |
| 9,527,021 | B2 | 12/2016 | Gatica et al. | |
| 9,757,670 | B2 | 9/2017 | Lam et al. | |
| 2011/0247974 | A1* | 10/2011 | Gale | B01D 35/30 210/238 |
| 2015/0114896 | A1* | 4/2015 | Lam | B01D 35/30 210/236 |
| 2018/0318738 | A1 | 11/2018 | Chernov et al. | |

FOREIGN PATENT DOCUMENTS

| CN | 202538450 U | 11/2012 |
| JP | 2003-251110 A | 9/2003 |
| KR | 10-2012-0038299 A | 4/2012 |
| WO | WO 2010/027989 A2 | 3/2010 |

OTHER PUBLICATIONS

European Patent Office, Extended European Search Report in counterpart European Patent Application No. 21174670.6, dated Oct. 20, 2021.

* cited by examiner

*Primary Examiner* — Madeline Gonzalez
(74) *Attorney, Agent, or Firm* — Leydig Voit & Mayer, Ltd.

(57) ABSTRACT

A manifold assembly including a guide rod, a method of moving a filter capsule along the manifold assembly, and a method of filtering fluid using the manifold assembly are provided.

8 Claims, 16 Drawing Sheets

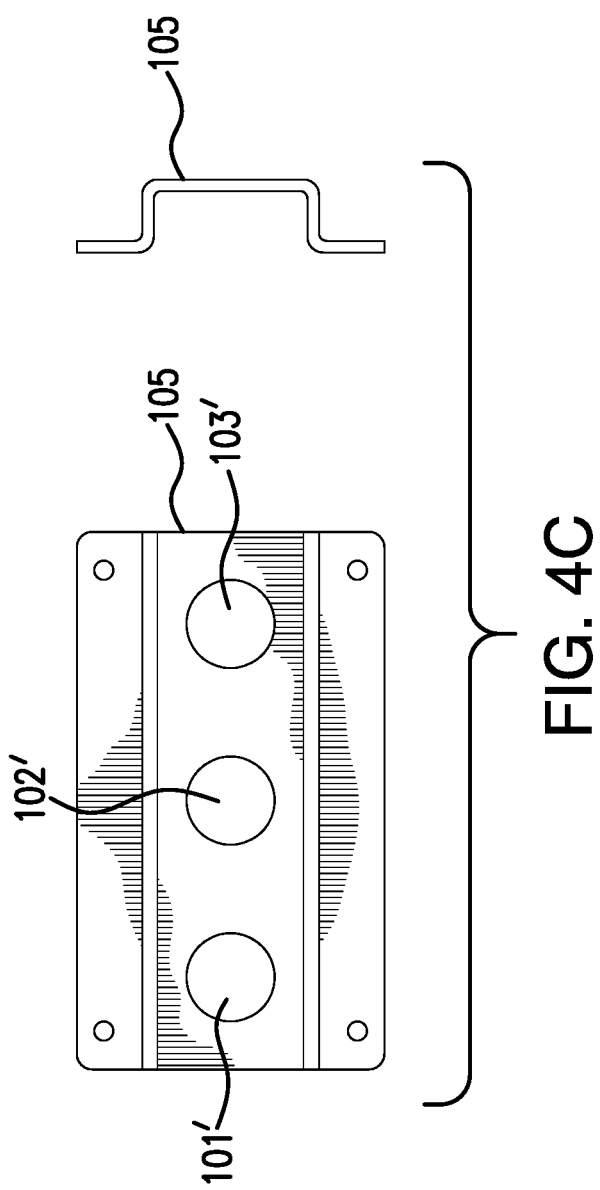

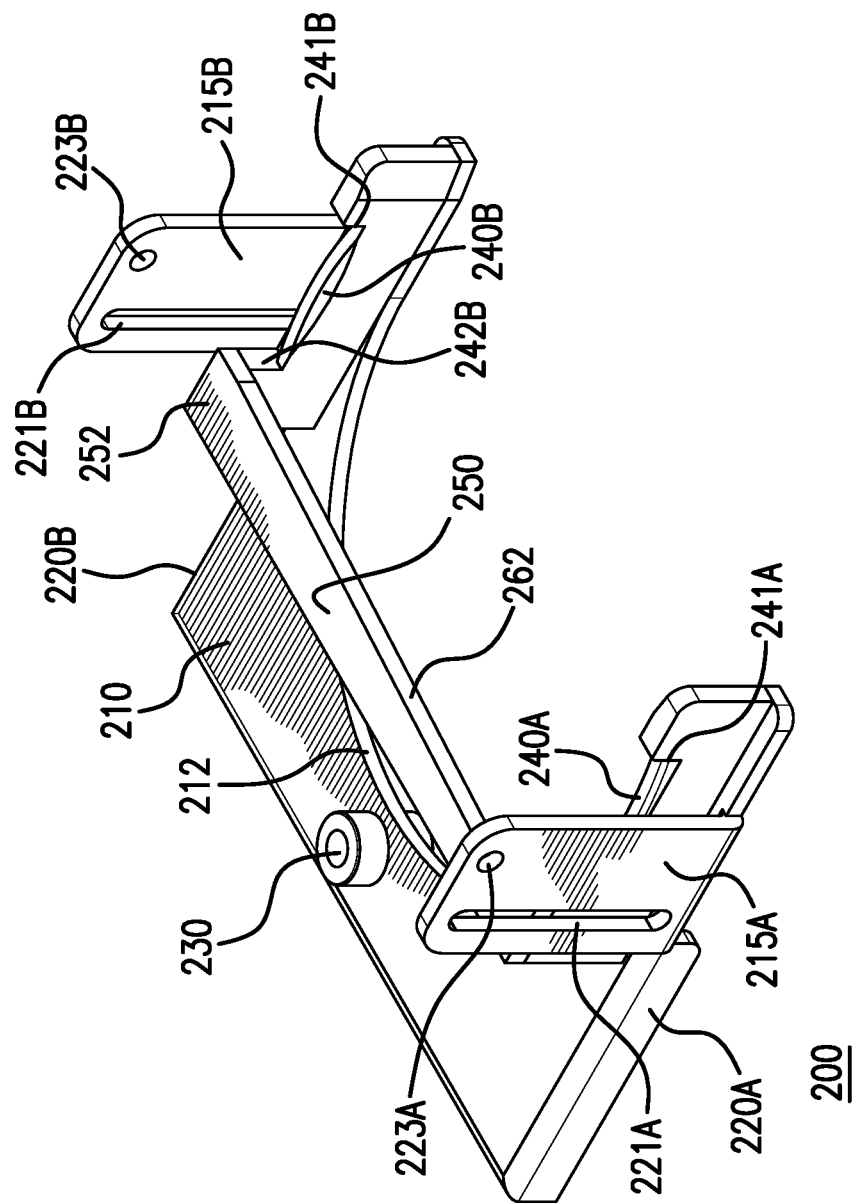

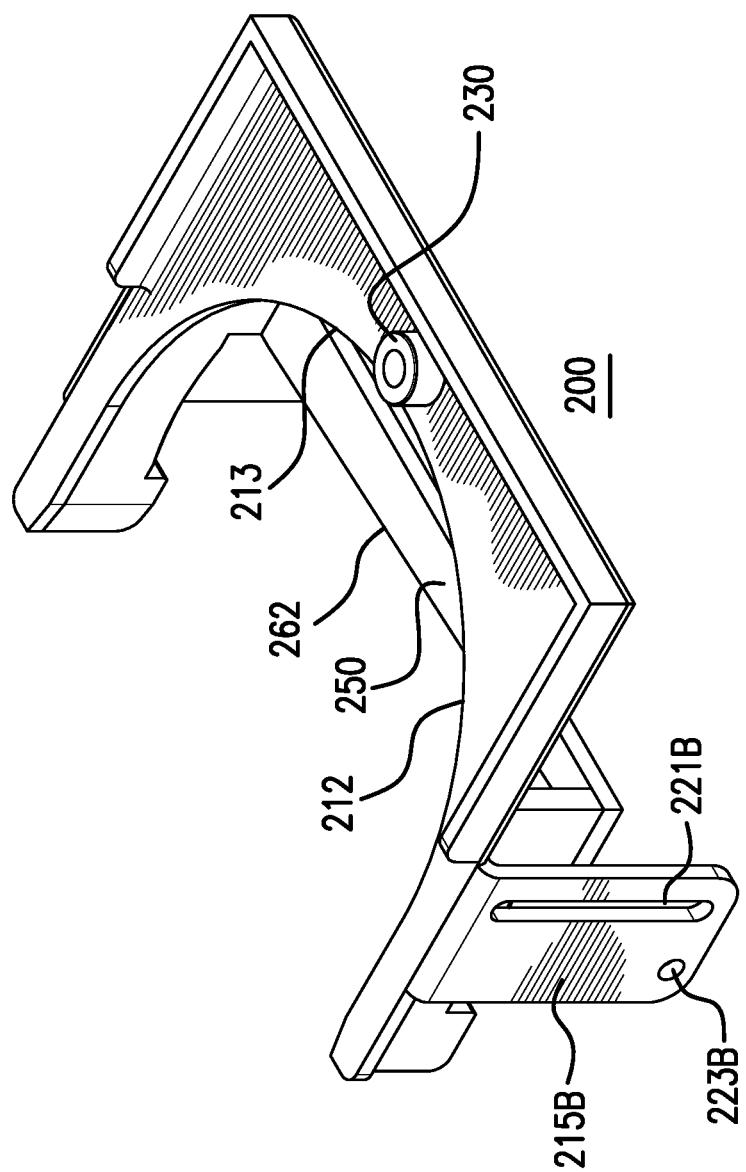

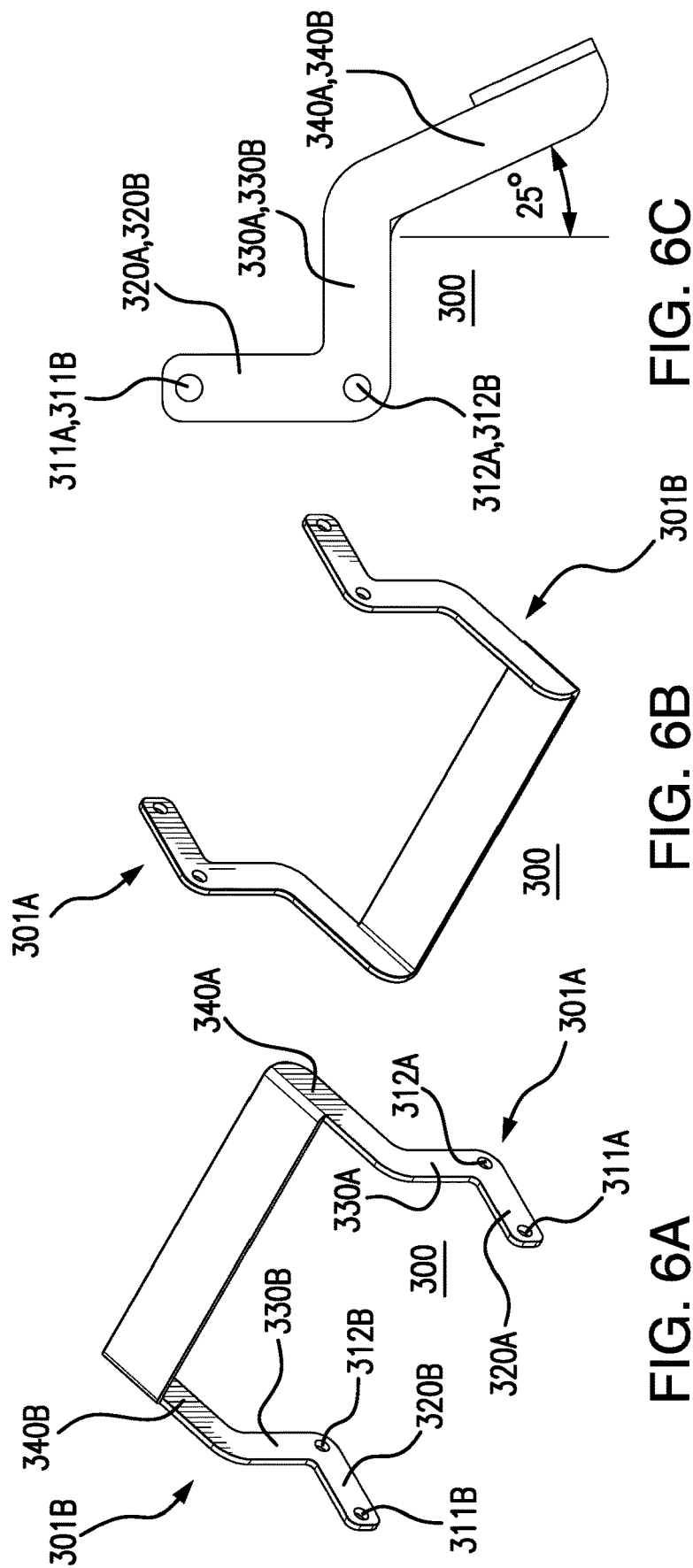

MANIFOLD ASSEMBLY AND METHOD OF USE

CROSS-REFERENCE TO RELATED APPLICATIONS

This patent application claims the benefit of Chinese Patent Application No. 202010512864.7, filed Jun. 8, 2020, which is incorporated by reference.

BACKGROUND OF THE INVENTION

Manifold assemblies can be used for change-outs of filters. However, there is a need for improved manifold assemblies.

BRIEF SUMMARY OF THE INVENTION

An embodiment of the invention provides a manifold assembly for use with a filter capsule comprising a filter capsule housing including at least a filter inlet port and a filter outlet port, the manifold assembly comprising: a manifold; a carriage assembly for receiving a filter capsule, the filter capsule having at least a filter inlet port and a filter outlet port; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving a filter capsule housing; opposing first and second side walls, the first and second side walls each including a vertically arranged member having a vertical slot passing through the vertical member for one of the pair of first shafts for engaging the manifold with a carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (0 each of the pair of third shafts passing through respective second lever through holes and the horizontal slots of the manifold.

Typically, a first conduit passes through the manifold inlet port and a second conduit passes through the manifold outlet port, wherein the pivotable lever is pivotable between a first position allowing the manifold assembly to receive the filter capsule, and a second position engaging the filter capsule with the manifold assembly such that the filter inlet port and the filter outlet port are respectively engaged with the first conduit passing through the manifold inlet port and the second conduit passing through the manifold outlet port.

In another embodiment, a method of moving a filter capsule along a manifold assembly is provided, the method comprising seating a filter capsule comprising a filter capsule housing including at least a filter inlet port and a filter outlet port on a moveable carriage assembly of a manifold assembly, the manifold assembly comprising: a manifold; the carriage assembly; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving a filter capsule housing; opposing first and second side walls, the first and second side walls each including a vertically arranged member having a vertical slot passing through the vertical member for one of the pair of first shafts for engaging the manifold with a carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (f) each of the pair of third shafts passing through respective second lever through holes and the horizontal slots of the manifold; and, moving the carriage assembly and the seated filter capsule from a first position wherein the filter inlet and outlet ports are spaced from the manifold inlet and outlet ports, to a second position wherein the filter inlet and outlet ports are moved toward the manifold inlet and outlet ports.

Preferably, a first conduit passes through the manifold inlet port and a second conduit passes through the manifold outlet port, and the method includes pivoting the pivotable lever from the first position allowing the manifold assembly to receive the filter capsule, to the second position engaging the filter capsule with the manifold assembly such that the filter inlet port and the filter outlet port are respectively engaged with the first conduit passing through the manifold inlet port and the second conduit passing through the manifold outlet port.

In a typical embodiment, the method further comprises moving the carriage assembly from the second position to the first position to move the filter inlet and outlet ports a distance away from the manifold inlet and outlet ports, the method further including removing the filter capsule from the manifold assembly.

In yet another embodiment, a method of filtering fluid is provided, the method comprising seating a filter capsule comprising a filter capsule housing including at least a filter inlet port and a filter outlet port on a moveable carriage assembly of the manifold assembly, wherein first and second conduits pass through the manifold inlet and outlet ports respectively; moving the carriage assembly and the seated filter capsule from a first position wherein the filter inlet and outlet ports are spaced from the manifold inlet and outlet ports, to a second position wherein the filter inlet and outlet ports are moved toward the manifold inlet and outlet ports and the first and second conduits are sealingly engaged with the respective filter inlet and outlet ports; passing fluid through the first conduit in the manifold inlet port and the filter inlet port through a filter comprising a porous filter in the filter capsule, and passing filtered fluid through the outlet port of the filter capsule and the second conduit in the manifold outlet port.

BRIEF DESCRIPTION OF THE SEVERAL VIEWS OF THE DRAWING(S)

FIGS. 1A-1C are perspective views of a manifold assembly comprising a manifold, a carriage assembly, and a lever according to an embodiment of the invention. FIG. 1A shows the manifold assembly in a first (unlocked) position, FIG. 1B shows the manifold assembly in a second (locked) position, and FIG. 1C shows the manifold assembly in the locked position, also showing includes fittings connected to first, second, and third conduits passing through the manifold assembly inlet, outlet, and vent ports.

FIG. 2 shows the manifold assembly with fittings in the manifold assembly, and a filter capsule, wherein the manifold assembly is in the locked position having received the filter capsule.

FIGS. 3A-3C show side views of the manifold assembly with fittings in the manifold assembly, with the filter capsule. FIG. 3A shows the manifold assembly in the unlocked position, FIG. 3B shows the manifold assembly in the locked position, wherein carriage assembly including the filter capsule is moved vertically upwards, and the filter capsule inlet, outlet, and vent ports seal against conduits (connected to fittings) passing through the manifold assembly vent, inlet, and outlet ports; and FIG. 3C shows a sectional view along line D-D in FIG. 3B.

FIG. 3D shows a top cut-away view of part of the manifold assembly with the filter capsule, showing the top of the filter capsule received in the carriage assembly, wherein the manifold assembly has an angled strut (shown in broken lines), and the filter capsule includes a filter inlet port, a filter outlet port, and a filter vent port, and the top of the filter capsule housing includes an angled extension, and two tabs, also showing the fool-proof design of the manifold assembly, as the filter capsule cannot be installed if the capsule is rotated 180°.

FIGS. 4A-4D show various views of an illustrative manifold in the manifold assembly according to an embodiment of the invention. FIG. 4A shows a bottom perspective view with the inner support plate; FIG. 4B shows a top perspective view; FIG. 4C shows bottom and side views of the inner support plate; and FIG. 4D shows conduits held between the manifold and the inner support plate.

FIGS. 5A-5C show various views of an illustrative carriage assembly in the manifold assembly according to an embodiment of the invention. FIG. 5A shows a perspective top view, FIG. 5B shows a top view, also showing the angled front wall of the strut; and FIG. 5C shows a perspective bottom view.

FIGS. 6A-6C show various views of an illustrative lever in the manifold assembly according to an embodiment of the invention. FIG. 6A shows a perspective top view, FIG. 6B shows a perspective bottom view, and FIG. 6C shows a side view.

FIG. 7A shows a perspective top view, and FIG. 7B shows a side view.

DETAILED DESCRIPTION OF THE INVENTION

Figure 1A:
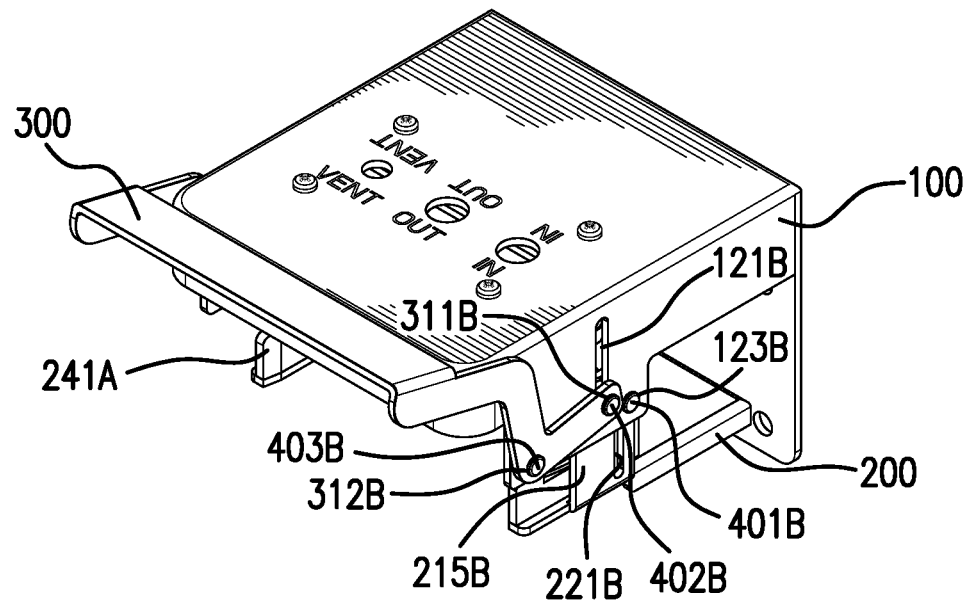
Figure 1B:
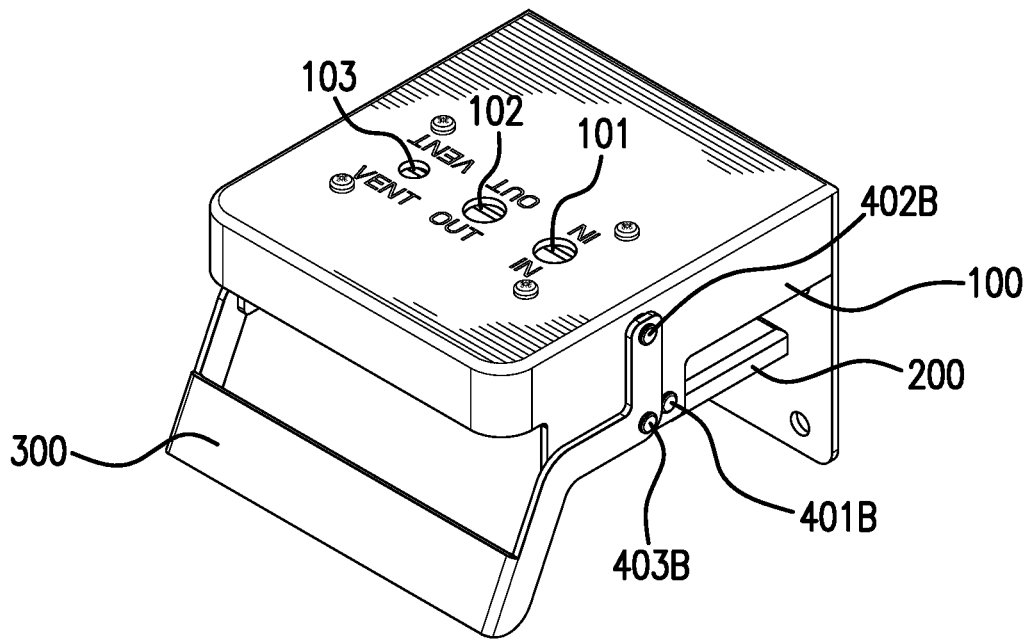
Figure 1C:
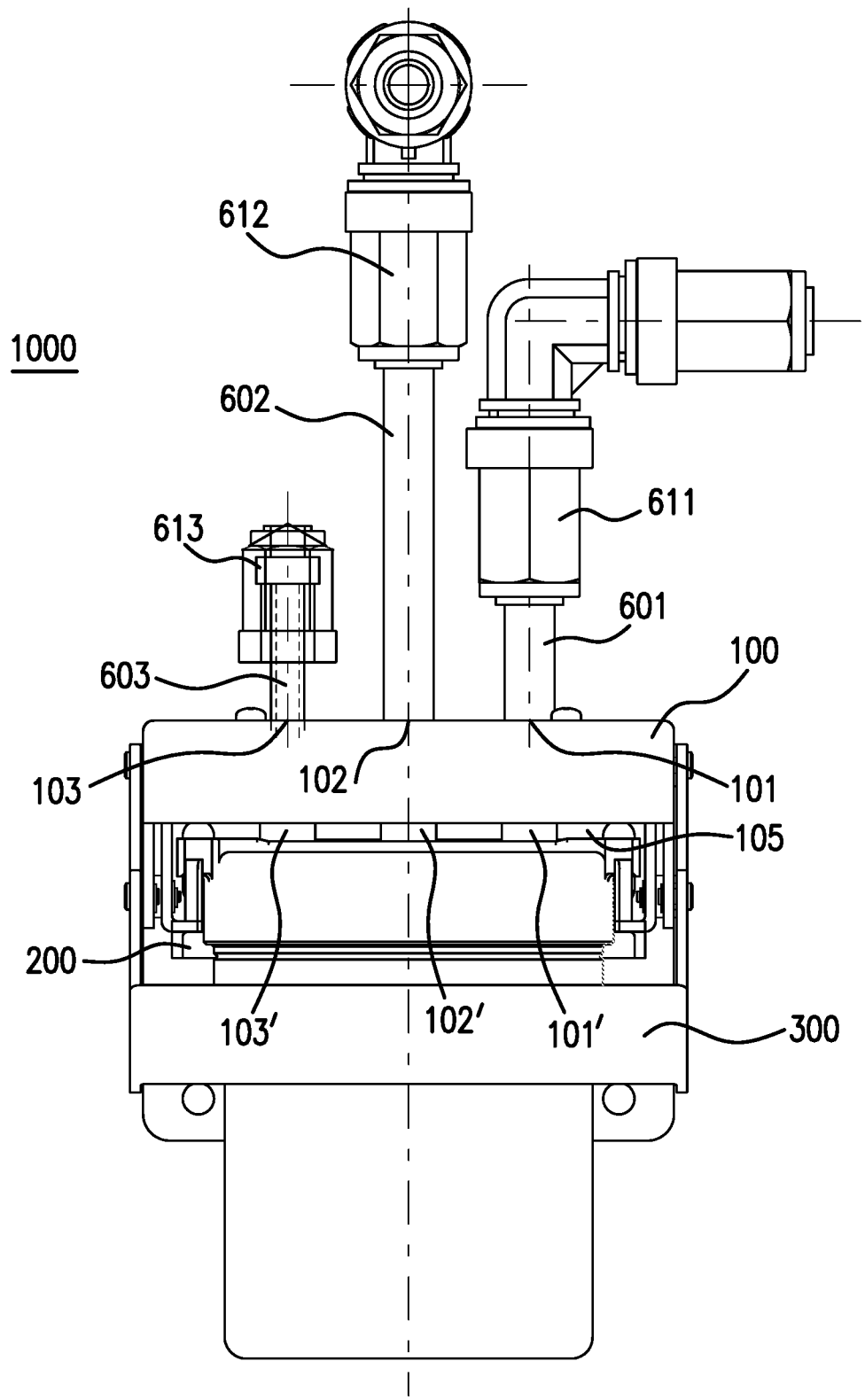

An embodiment of the invention provides a manifold assembly for use with a filter capsule comprising a filter capsule housing including at least a filter inlet port and a filter outlet port, the manifold assembly comprising: a manifold; a carriage assembly for receiving a filter capsule, the filter capsule having at least a filter inlet port and a filter outlet port; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving a filter capsule housing; opposing first and second side walls, the first and second side walls each including a vertically arranged member having a vertical slot passing through the vertical member for one of the pair of first shafts for engaging the manifold with a carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (0 each of the pair of third shafts passing through respective second lever through holes and the horizontal slots of the manifold.

Typically, a first conduit passes through the manifold inlet port and a second conduit passes through the manifold outlet port, wherein the pivotable lever is pivotable between a first position allowing the manifold assembly to receive the filter capsule, and a second position engaging the filter capsule with the manifold assembly such that the filter inlet port and the filter outlet port are respectively engaged with the first conduit passing through the manifold inlet port and the second conduit passing through the manifold outlet port.

In another embodiment, a method of moving a filter capsule along a manifold assembly is provided, the method comprising seating a filter capsule comprising a filter capsule housing including at least a filter inlet port and a filter outlet port on a moveable carriage assembly of a manifold assembly, the manifold assembly comprising: a manifold; the carriage assembly; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving a filter capsule housing; opposing first and second side walls, the first and second side walls each including a vertically arranged member having a vertical slot passing through the vertical member for one of the pair of first shafts for engaging the manifold with a carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (f) each of the pair of third shafts passing through respective second lever through holes and the horizontal slots of the manifold; and, moving the carriage assembly and the seated filter capsule from a first position wherein the filter inlet and outlet ports are spaced from the manifold inlet and outlet ports, to a second position wherein the filter inlet and outlet ports are moved toward with the manifold inlet and outlet ports.

Preferably, a first conduit passes through the manifold inlet port and a second conduit passes through the manifold outlet port, and the method includes pivoting the pivotable lever from the first position allowing the manifold assembly to receive the filter capsule, to the second position engaging the filter capsule with the manifold assembly such that the filter inlet port and the filter outlet port are respectively engaged with the first conduit passing through the manifold inlet port and the second conduit passing through the manifold outlet port.

In a typical embodiment, the method further comprises moving the carriage assembly from the second position to the first position to move the filter inlet and outlet ports a distance away from the manifold inlet and outlet ports, the method further including removing the filter capsule from the manifold assembly.

In another embodiment, a method of filtering fluid is provided, the method comprising seating a filter capsule comprising a filter capsule housing including at least a filter inlet port and a filter outlet port on a moveable carriage assembly of the manifold assembly, wherein first and second conduits pass through the manifold inlet and outlet ports respectively, moving the carriage assembly and the seated filter capsule from a first position wherein the filter inlet and outlet ports are spaced from the manifold inlet and outlet ports, and the first and second conduits are not sealingly engaged with the respective filter inlet and outlet ports, to a second position wherein the filter inlet and outlet ports are moved toward the manifold inlet and outlet ports and the first and second conduits are sealingly engaged with the respective filter inlet and outlet ports; passing fluid through the first conduit in the manifold inlet port and the filter inlet port through a filter comprising a porous filter in the filter capsule, and passing filtered fluid through the outlet port of the filter capsule and the second conduit in the manifold outlet port.

Figure 3A:
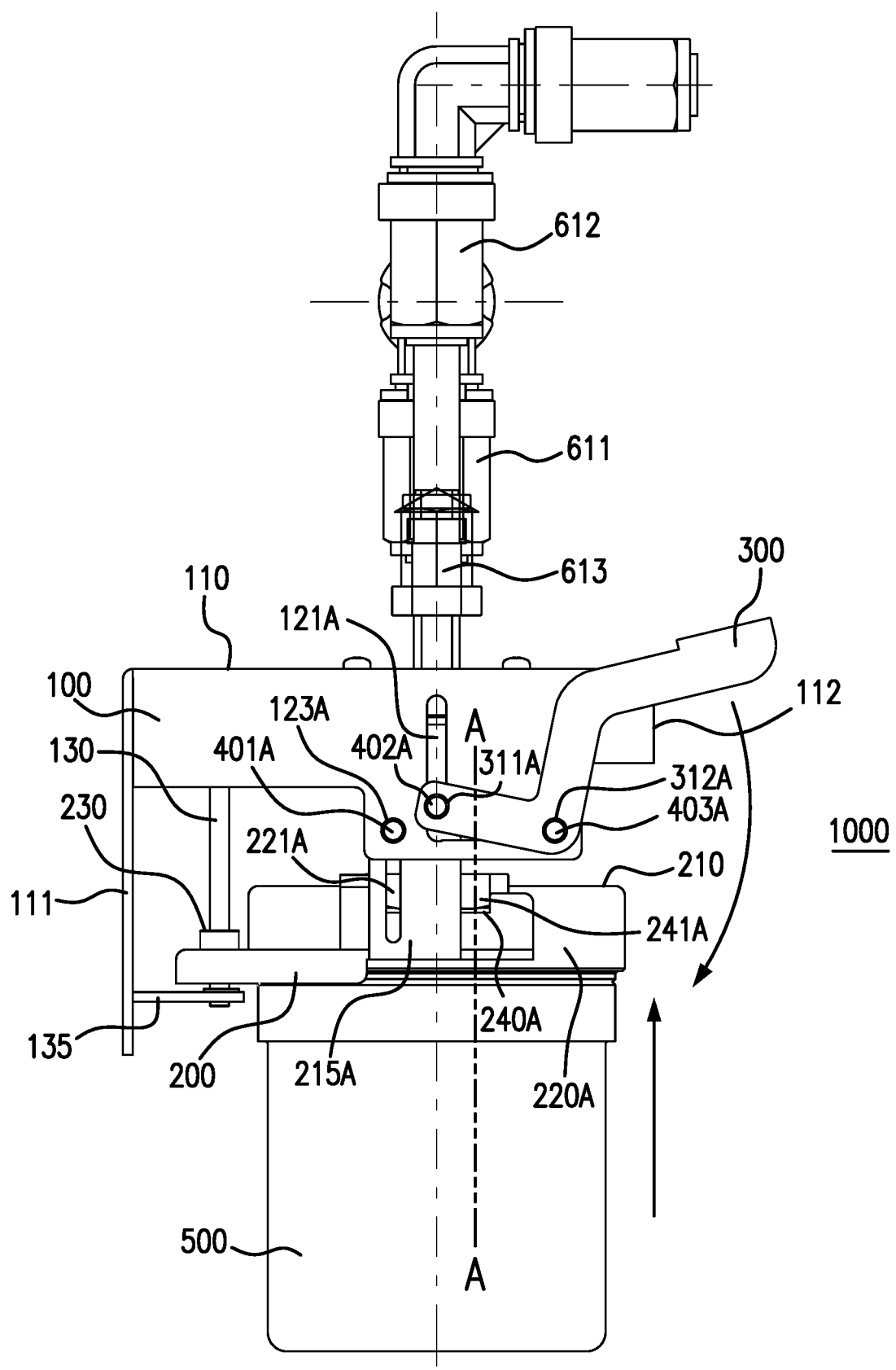
Figure 3B:
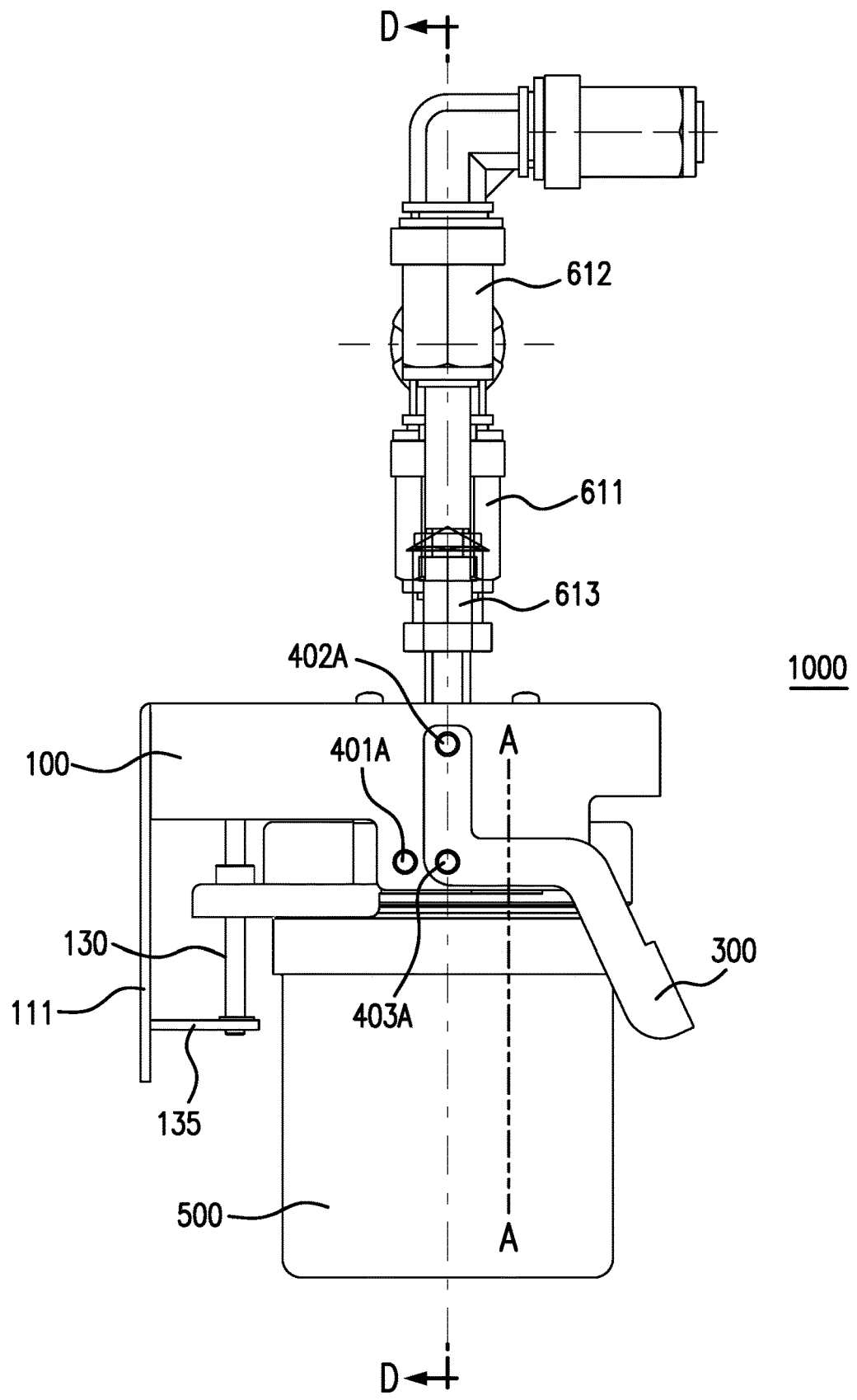
Figure 3C:
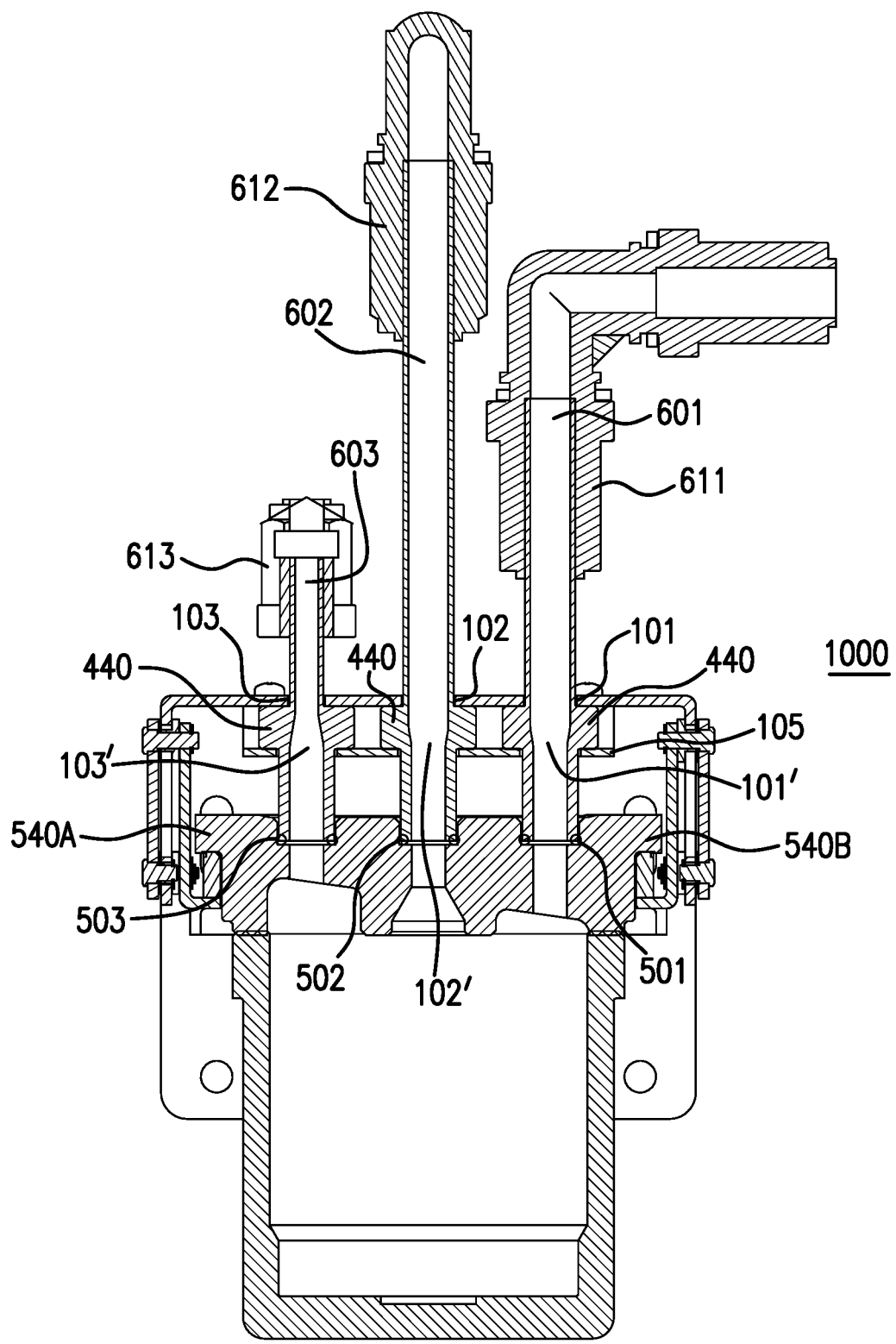
Figure 3D:
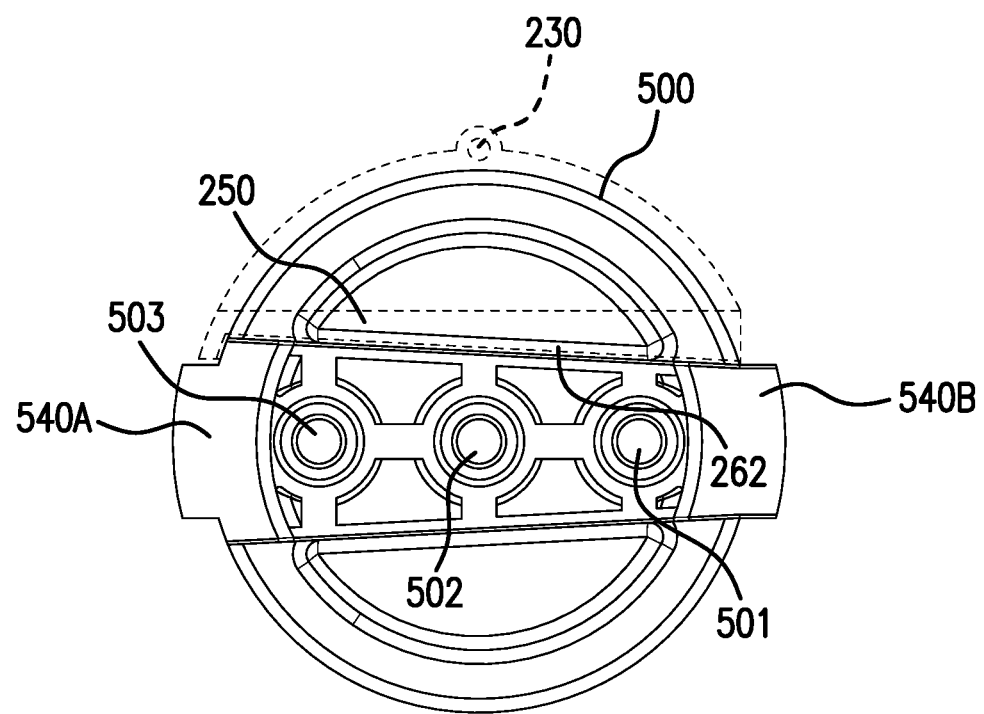

Advantageously, filter capsules can be inserted (installed) and removed easily after use, while preventing the filter capsule from being inserted incorrectly (see, FIG. 3D).

Embodiments of the invention can be used with a variety of filters and filter capsules, including, for example, those available from Pall Corporation (East Hills, N.Y.). The filter and filter capsules are suitable for filtering a variety of fluids, including, but not limited to, a broad range of slurries and liquids, such as photochemical dispense slurries and liquids, e.g., as used in lithography.

Each of the components of the invention will now be described in more detail below, wherein like components have like reference numbers.

In accordance with the embodiment of the invention as illustrated in FIGS. 1A-1C, 2, 3A-3C, a manifold assembly 1000 comprises a manifold 100, a carriage assembly 200, and a lever 300. As will be discussed in more detail below, the manifold includes at least two ports, and in use, the manifold assembly further includes hollow inserts such as conduits passing through the manifold ports for fluid communication with the filter capsule ports, wherein the hollow inserts further comprise attached fittings (e.g., for communicating with a source of fluid to be filtered, for directing the filtered fluid to a desired location, and for venting).

Figure 2:
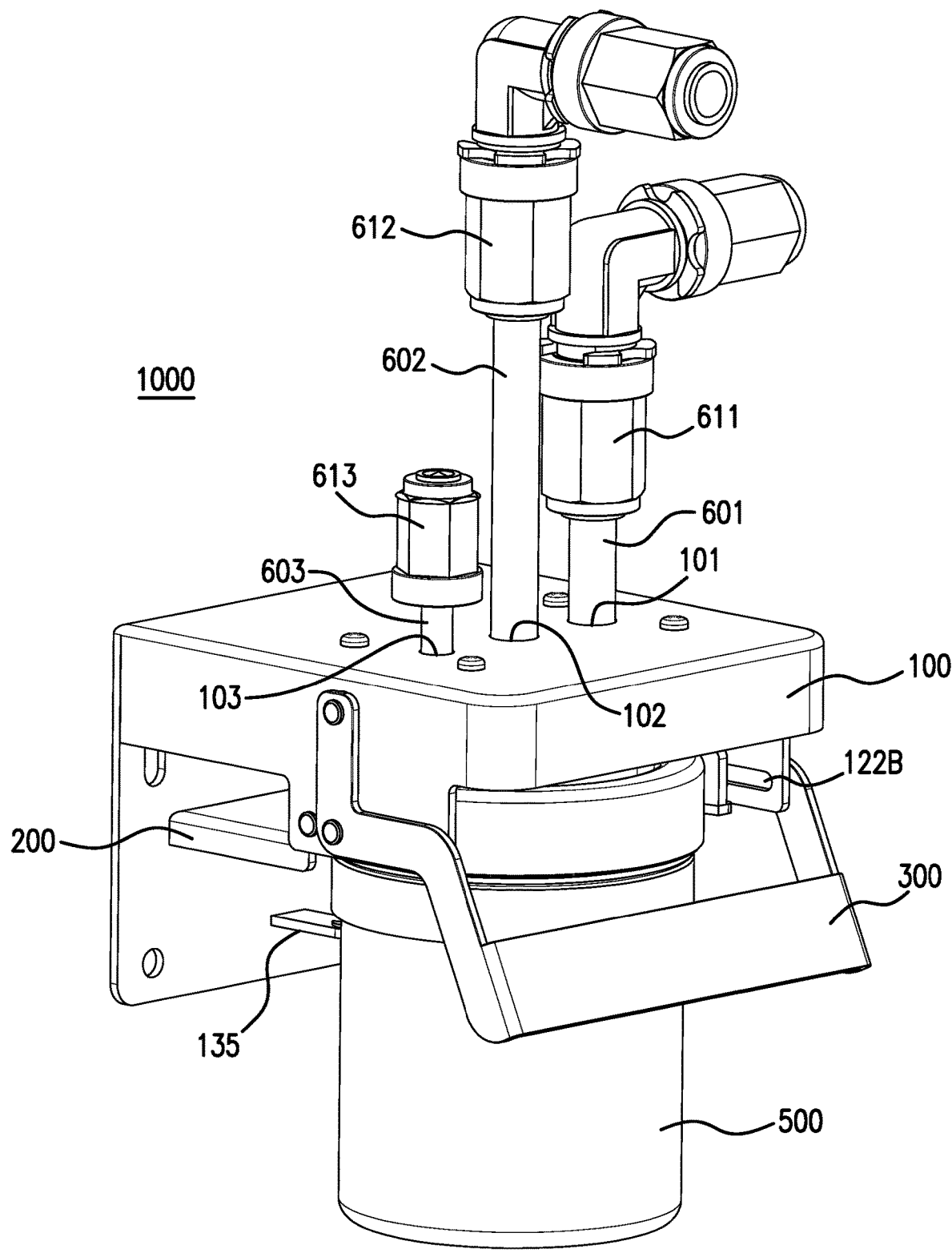
Figure 7A:
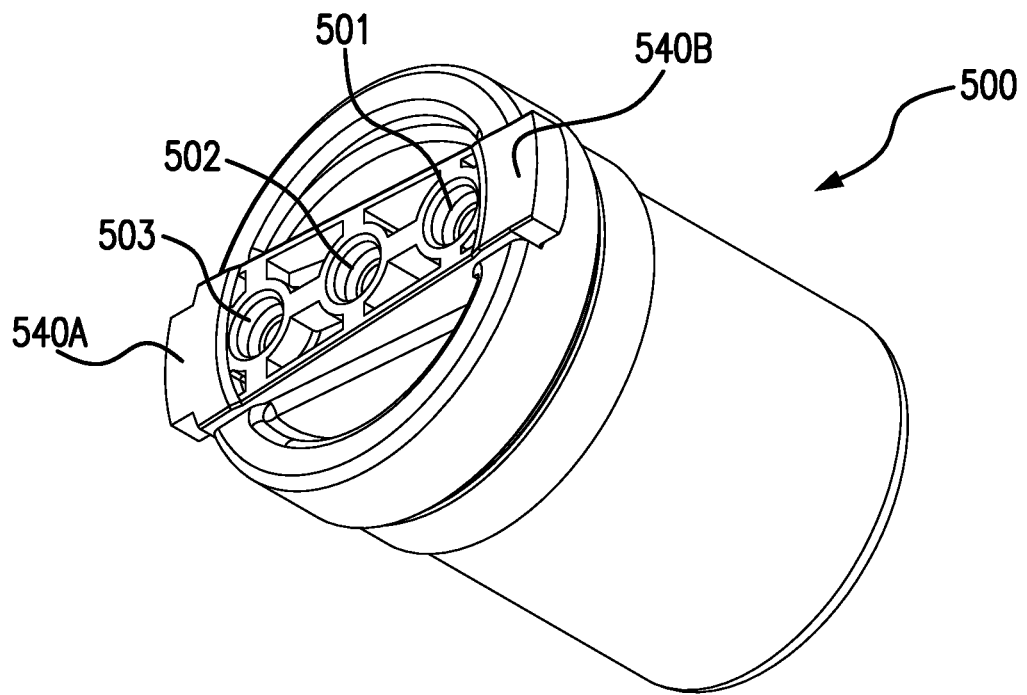
FIGS. 7A-7B show various views of an illustrative filter capsule.
Figure 7B:
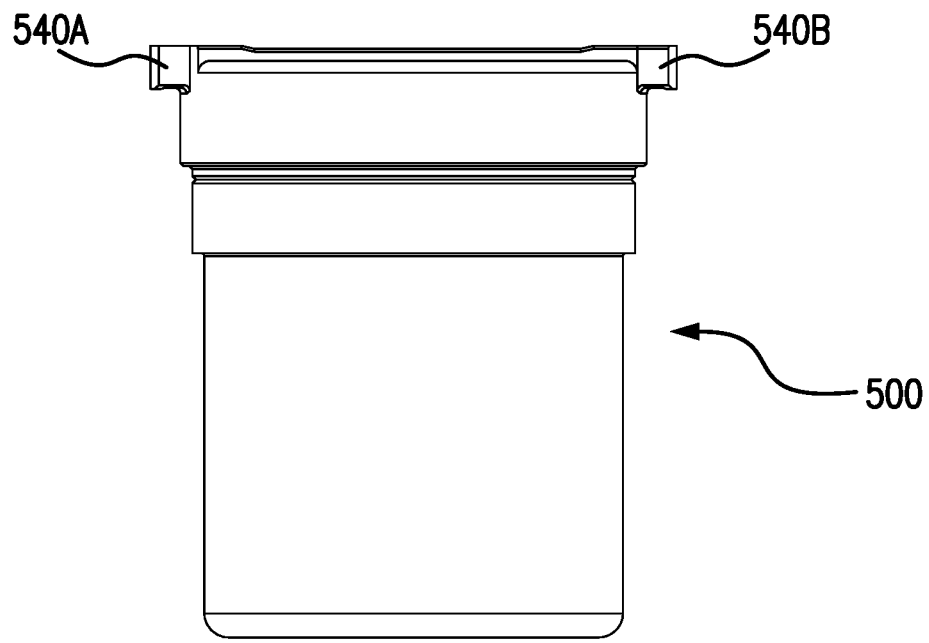

FIGS. 1A, 2, and 3A show the manifold assembly 1000 in a first (unlocked) position for receiving a filter capsule, and FIGS. 1B, 1C, 3B, and 3C show the manifold assembly in a second (locked) position for receiving the filter capsule. FIGS. 2, 3A, and 3B, show, sequentially, insertion of a filter capsule 500 into the carriage assembly wherein the lever is in an upwards position, and pushing the lever downwardly and moving the carriage assembly with the seated filter capsule upwardly (along vertical axis "A-A") to lock the manifold and seated filter capsule in the second position. As will be discussed in more detail below, FIG. 3D shows that the carriage assembly is configured to prevent the filter capsule from being inserted incorrectly (see also, FIGS. 7A and 7B).

FIGS. 4A-4D show various views of an illustrative manifold 100, FIGS. 5A-5D show various views of an illustrative carriage assembly 200, and FIGS. 6A and 6C show various views of an illustrative lever 300, in a manifold assembly 1000 according to an embodiment of the invention.

Figure 4A:
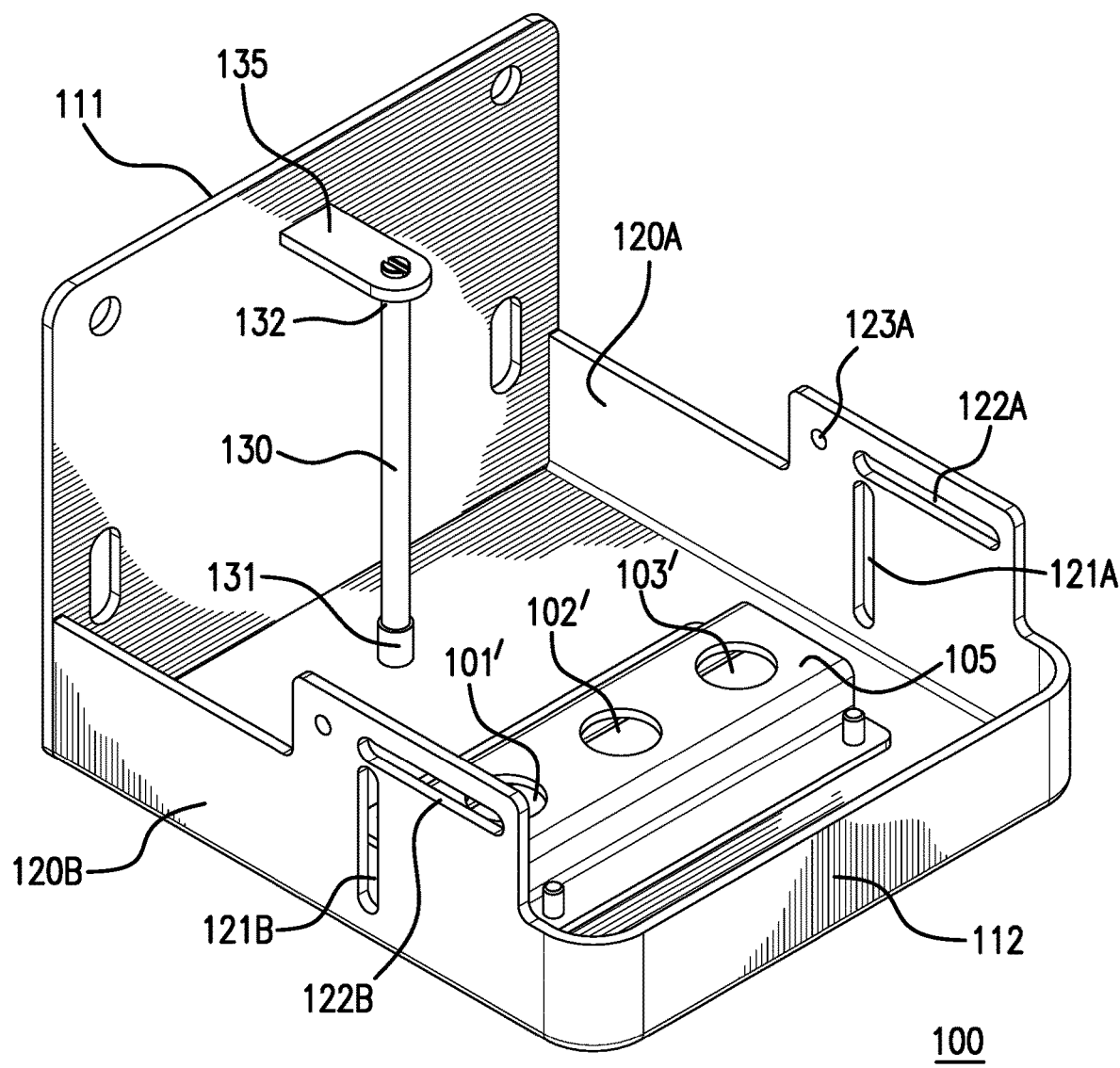
Figure 4B:
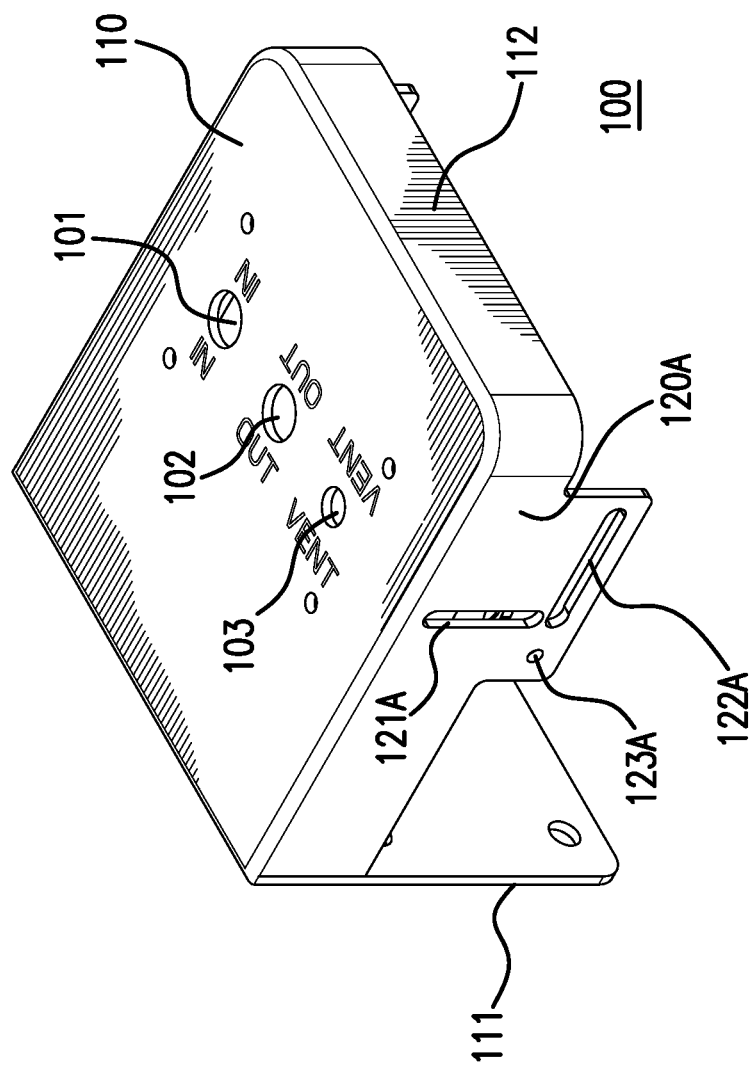

Using FIGS. 4A-4B for reference, the illustrated manifold 100 comprises at least a manifold inlet port 101 and a manifold outlet port 102, and preferably includes a vent port 103; a top wall 110; opposing first and second side walls 120A, 120B, the first and second side walls each including, passing through the respective first and second side walls: a vertical slot 121A, 121B; a horizontal slot 122A, 122B; and a first manifold through hole 123A, 123B for one of the pair of first shafts for engaging the manifold with the carriage assembly; a rear wall 111; a front wall 112; a guide rod 130 having an upper end 131 and a lower end 132, the guide rod being arranged parallel to, and spaced away from, the rear wall; a ledge 135 connected to the rear wall, the ledge being arranged perpendicular to the rear wall, and parallel to and below the top wall; wherein the upper end of the guide rod is connected to the top wall, and the lower end of the guide rod is connected to the ledge.

Figure 4D:
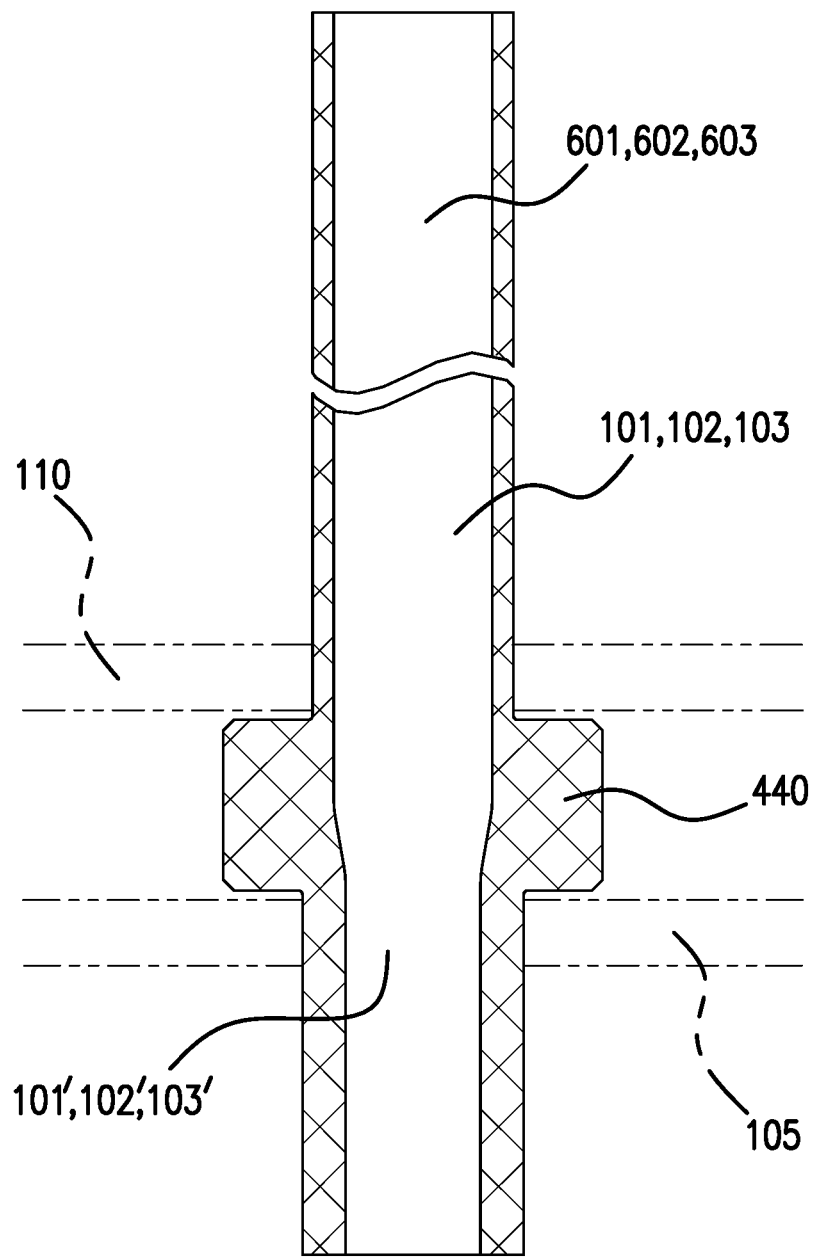

FIGS. 1C, 3C, 4C, and 4D show an inner support plate 105, e.g., a bent plate (illustrated as a squared off generally u-shaped plate) mounted to the lower surface of the top wall 110, including circular apertures 101', 102', and 103'axially aligning with the ports 101, 102, and 103, and FIGS. 3C and 4D shows the conduits passing through the apertures and ports. Typically, as shown in FIGS. 3C and 4D, the outer walls of the conduits have extensions 440 such as tabs so that the conduits can be held in position between the top wall and the inner support plate. The extensions can be integral with the conduits, or attached. In those embodiments wherein the conduits include extensions, the conduits are inserted in the ports 101, 102, 103, before the inner support plate is attached.

Figure 5B:
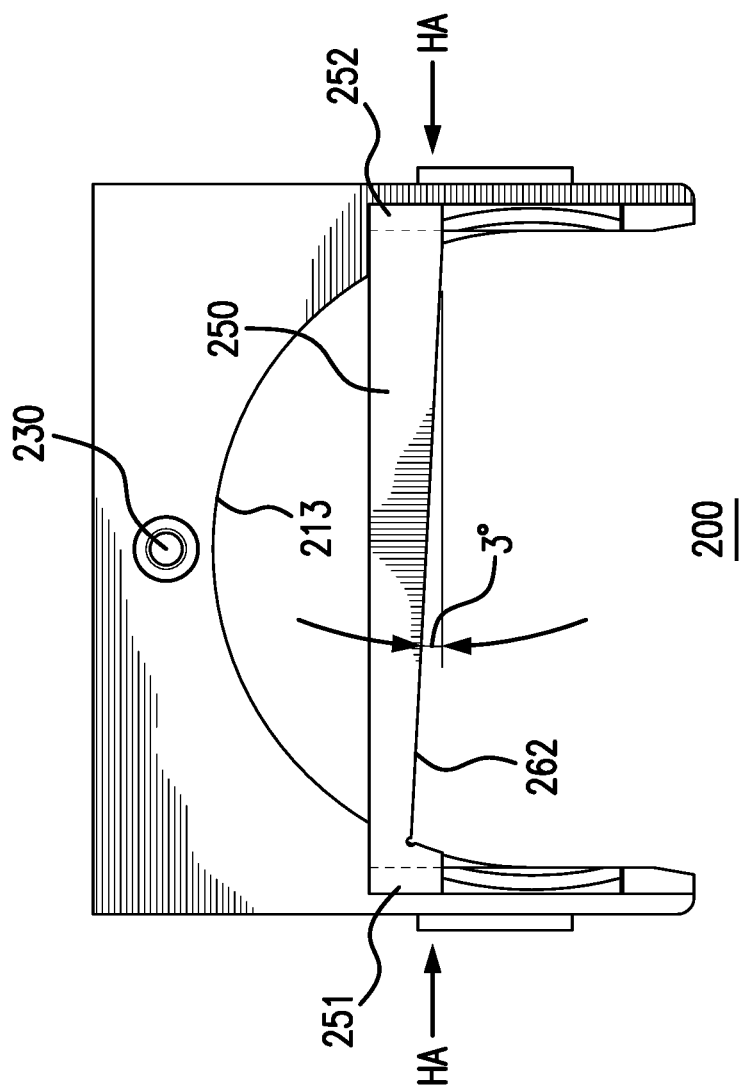

Using FIGS. 5A-5C for reference, the illustrated carriage assembly 200 comprises a top wall 210, the top wall including a guide rod opening 230 passing through the top wall (the guide rod opening allowing the carriage assembly 200 to move up and down along the guide rod 130); a front wall 212 with a curved cut out 213 for receiving a filter capsule housing; opposing first and second side walls 220A, 220B, the first and second side walls each including a vertically arranged member 215A, 215B having a vertical slot 221A, 221B, passing through the vertical member for one of the pair of first shafts for engaging the manifold with a carriage assembly, a vertical member through hole 223A, 223B, for receiving a second rod for engaging the manifold with the carriage assembly and the pivotable lever, and a shelf 240A, 240B, including a first shoulder 241A, 241B, and second shoulder 242A, 242B, the shelf being configured to receive, between the first and second shoulders, a tab 540A, 540B (see FIGS. 2 and 3D) on the filter capsule housing. Preferably, as shown in FIGS. 5B and 3D, a strut 250 having a first end 251 is attached to a portion of shelf 240A and a second end 252 is attached to a portion of shelf 240B (e.g., FIG. 5A shows the first end 251 and the second end 252 are attached to the upper parts of the second shoulders 242A, 242B), the strut having a front wall 262 arranged at an angle (e.g., with respect to the horizontal axis HA-HA as shown in FIG. 5B) that is the opposite of the angle of the extension on the top of the filter capsule housing, to prevent the filter capsule from being inserted incorrectly (see FIG. 3D).

Using FIGS. 6A-6C for reference, the illustrated lever 300, that is pivotable from a first position allowing the manifold assembly 1000 to receive or remove the filter capsule 500 (see also, FIG. 2), to a second position engaging the seated filter capsule with the manifold assembly such that upon moving the filter capsule the filter ports are moved toward the respective manifold ports (and the inserts such as conduits passing through the manifold ports are respectively engaged with the filter capsule ports to allow fluid communication), has a pair of arms 301A, 301B, each arm including a respective a first lever through hole 311A, 311B, for one of the pair of second shafts for engaging the carriage assembly 200 with the manifold 100 and the pivotable lever 300, and a second lever through hole 312A, 312B for one of the pair of third shafts for engaging the manifold 100 with the pivotable lever 300, the second lever through hole 312A, 312B, being spaced away from the first lever through hole 311A, 311B.

In the illustrated configuration, each lever arm has a lower portion 320A, 320B, a middle portion, 330A, 330B, and an upper portion 340A, 340B, with a common arm 350 connecting the upper portions 340A, 340B. When the arm 350 is moved fully upwards, the lower portion is typically horizontally arranged (e.g., perpendicular to vertical axis "A-A", the middle portion is generally vertically arranged, and the upper portion is angled; while a variety of angles are suitable, FIG. 6C shows an angle of 25°). The lower portions 320A, 320B, include lower ends 321A, 321B of the arms 301A, 301B, and the upper portions 340A, 340B include upper ends 322A, 321B of the arms 301A, 301B, wherein, in the illustrated configuration, the first lever through holes 311A, 311B are located near the ends 321A, 321B, and the second lever through holes 312A, 312B are located at or near the positions where the lower portions, 320A, 320B, join the middle portions 330A, 330B.

Embodiments of the invention preferably include a plurality of shafts passing through various components of the manifold assembly to allow efficient sliding and/or pivoting as needed. Typically, the shafts comprise cylindrical pins having retainers (for example, circlips) mounted at each end of the shafts to keep the pins retained in the manifold assembly, and may include, for example, washers to maintain spacing. However, other arrangements are possible, e.g., the shaft can be provided as a rivet, or the shaft can have a bolt head at one end and a threaded portion with a nut at the other end, and a smooth portion between the bolt head and the threaded portion, allowing sliding and/or pivoting as appropriate.

Embodiments of the invention typically have a pair of first shafts 401A, 401B, each of the pair of first shafts passing through the respective first manifold through holes 123A, 123B and the vertical slots passing through the vertical members of the carriage assembly; a pair of second shafts 402A, 402B, each of the pair of second shafts passing through the respective vertical slots 121A, 121B of the manifold, the vertical member through holes 223A, 223B of the carriage assembly and the first lever through holes 311A, 311B; and a pair of third shafts 403A, 403B, each of the pair of third shafts passing through respective second lever through holes 312A, 312B and the horizontal slots 122A, 122B of the manifold.

In use (see FIGS. 1C, 2, 3A-3C), embodiments of the manifold assembly typically further comprise hollow inserts such as first, second, and third conduits 601, 602, 603 passing through the manifold ports 101, 102, and 103, for fluid communication with ports 501, 502, 503 on the filter capsule 500 (see FIGS. 3D, 7A, and 7B), wherein the hollow inserts are attached to fittings 611, 612, 613 (e.g., for communicating with a source of fluid to be filtered, for directing the filtered fluid to a desired location, and for venting). In moving to the second position of the manifold assembly, wherein the filter ports are moved toward the manifold ports and the conduits, the ends of the conduits facing the ports on the filter capsules are sealingly inserted into the ports, and preferably, resilient members such as o-rings are present in the openings of the ports (see FIG. 3C) and fit over the outer surfaces of the conduits to improve the seal between the filter capsule ports and the ends of the conduits.

A variety of materials are suitable for producing embodiments of the manifold assembly. In some embodiments, the conduits and fittings, for example, are plastic or polytetrafluoroethylene (PTFE) or perfluoroalkoxy alkane (PFA), and the other components are metal (e.g., stainless steel) and/or composite materials.

In an embodiment, a method of moving a filter capsule along a manifold assembly comprises seating a filter capsule comprising a filter capsule housing including at least a filter inlet port and a filter outlet port on a moveable carriage assembly of a manifold assembly, the manifold assembly comprising: a manifold; the carriage assembly; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving a filter capsule housing; opposing first and second side walls, the first and second side walls each including a vertically arranged member having a vertical slot passing through the vertical member for one of the pair of first shafts for engaging the manifold with a carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (f) each of the pair of third shafts passing through respective second lever through holes and the horizontal slots of the manifold; and, moving the carriage assembly and the seated filter capsule from a first position wherein the filter inlet and outlet ports are spaced away from the manifold inlet and outlet ports, to a second position wherein the filter inlet and outlet ports are moved toward the manifold inlet and outlet ports.

Preferably, a first conduit passes through the manifold inlet port and a second conduit passes through the manifold outlet port, and the method includes pivoting the pivotable lever from the first position allowing the manifold assembly to receive the filter capsule, to the second position engaging the filter capsule with the manifold assembly such that the filter inlet port and the filter outlet port are respectively engaged with the first conduit passing through the manifold inlet port and the second conduit passing through the manifold outlet port.

In a typical embodiment, the method further comprises moving the carriage assembly from the second position to the first position to move the filter inlet and outlet ports a distance away from the manifold inlet and outlet ports, the method further including removing the filter capsule from the manifold assembly.

In another embodiment, a method of filtering fluid is provided, the method comprising seating a filter capsule comprising a filter capsule housing including at least a filter inlet port and a filter outlet port on a moveable carriage assembly of the manifold assembly, the manifold assembly first and second conduits passing through the manifold inlet and outlet ports respectively, moving the carriage assembly and the seated filter capsule from a first position wherein the filter inlet and outlet ports are spaced from the manifold inlet and outlet ports, to a second position wherein the filter inlet and outlet ports are moved toward the manifold inlet and outlet ports and the first and second conduits are sealingly engaged with the respective filter inlet and outlet ports; passing fluid through the first conduit in the manifold inlet port and the filter inlet port through a filter comprising a porous filter in the filter capsule, and passing filtered fluid through the outlet port of the filter capsule and the second conduit in the manifold outlet port.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A manifold assembly for use with a filter capsule comprising a filter capsule housing including at least a filter inlet port and a filter outlet port, the manifold assembly comprising:
    a manifold;
    a carriage assembly for receiving the filter capsule, the filter capsule having at least the filter inlet port and the filter outlet port;
    a pivotable lever; and,
    a pair of first shafts; a pair of second shafts; and a pair of third shafts;
    (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall;
    (b) the carriage assembly having a top wall, the top wall including a guide rod opening passing through the top wall; a front wall with a cut out for receiving the filter capsule housing; opposing first and second side walls, the first and second side walls each including a vertically arranged member having a vertical slot passing through the vertical member for one of the pair of first shafts for engaging the manifold with the carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing;
    (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole;
    (d) each of the pair of first shafts passing through the respective first manifold through holes and the vertical slots passing through the vertical members of the carriage assembly;
    (e) each of the pair of second shafts passing through the respective vertical slots of the manifold, the vertical member through holes of the carriage assembly and the first lever through holes; and
    (f) each of the pair of third shafts passing through respective second lever through holes and the horizontal slots of the manifold.

2. The manifold assembly of claim 1, wherein the carriage assembly includes a strut with a front wall arranged at an angle for aligning with an angled extension on the filter capsule housing.

3. A method of moving a filter capsule along a manifold assembly, the method comprising:
    seating the filter capsule comprising a filter capsule housing including at least a filter inlet port and a filter outlet port on a moveable carriage assembly of the manifold assembly, the manifold assembly comprising:
    a manifold; the carriage assembly; a pivotable lever; and, a pair of first shafts; a pair of second shafts; and a pair of third shafts; (a) the manifold having at least a manifold inlet port and a manifold outlet port; a top wall; opposing first and second side walls, the first and second side walls each including, passing through the respective first and second side walls:
    a vertical slot, a horizontal slot, and a first manifold through hole for one of the pair of first shafts for engaging the manifold with the carriage assembly; a rear wall; a guide rod arranged parallel to, and spaced away from, the rear wall; (b) the carriage assembly having a top wall, the top wall including a guide rod opening passing through the top wall; a front wall with a cut out for receiving the filter capsule housing; opposing first and second side walls, the first and second side walls each including a vertically arranged member having a vertical slot passing through the vertical member for one of the pair of first shafts for engaging the manifold with the carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing; (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole; (d) each of the pair of first shafts passing through the respective first manifold through holes and the vertical slots passing through the vertical members of the carriage assembly; (e) each of the pair of second shafts passing through the respective vertical slots of the manifold, the vertical member through holes of the carriage assembly and the first lever through holes; and (f) each of the pair of third shafts passing through respective second lever through holes and the horizontal slots of the manifold; and, moving the carriage assembly and the seated filter capsule from a first position wherein the filter inlet and outlet ports are spaced away from the manifold inlet and outlet ports, to a second position wherein the filter inlet and outlet ports are moved toward the manifold inlet and outlet ports.

4. The method of claim 3, wherein a first conduit passes through the manifold inlet port, and a second conduit passes through the manifold outlet port, and moving the carriage assembly and seated filter capsule from the first position to the second position includes engaging the first conduit with the filter inlet port and engaging the second conduit with the filter outlet port.

5. The method of claim 3, further comprising moving the carriage assembly from the second position to the first position to disengage the filter inlet and outlet ports from the first and second conduits.

6. A method of filtering fluid, the method comprising:
seating a filter capsule comprising a filter capsule housing including at least a filter inlet port and a filter outlet port on a carriage assembly for receiving the filter capsule, using a manifold assembly, the manifold assembly comprising
a manifold;
the carriage assembly
a pivotable lever; and,
a pair of first shafts; a pair of second shafts; and a pair of third shafts;
  (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall;
  (b) the carriage assembly having a top wall, the top wall including a guide rod opening passing through the top wall; a front wall with a cut out for receiving the filter capsule housing; opposing first and second side walls, the first and second side walls each including a vertically arranged member having a vertical slot passing through the vertical member for one of the pair of first shafts for engaging the manifold with the carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing;
  (c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole;
  (d) each of the pair of first shafts passing through the respective first manifold through holes and the vertical slots passing through the vertical members of the carriage assembly;
  (e) each of the pair of second shafts passing through the respective vertical slots of the manifold, the vertical member through holes of the carriage assembly and the first lever through holes; and
  (f) each of the pair of third shafts passing through respective second lever through holes and the horizontal slots of the manifold;
wherein first and second conduits pass through the manifold inlet and outlet ports respectively;
moving the carriage assembly and the seated filter capsule from a first position wherein the filter inlet and outlet ports are spaced from the manifold inlet and outlet ports, to a second position wherein the first and second conduits are sealingly engaged with the respective filter inlet and outlet ports;
passing fluid through the first conduit in the manifold inlet port and the filter inlet port through a filter comprising a porous filter in the filter capsule, and passing filtered fluid through the outlet port of the filter capsule and the second conduit in the manifold outlet port.

7. The method of claim 4, further comprising moving the carriage assembly from the second position to the first position to disengage the filter inlet and outlet ports from the first and second conduits.

8. A method of filtering fluid, the method comprising:
seating a filter capsule comprising a filter capsule housing including at least a filter inlet port and a filter outlet port on a carriage assembly for receiving the filter capsule, using a manifold assembly, the manifold assembly comprising
a manifold;
the carriage assembly
a pivotable lever; and,
a pair of first shafts; a pair of second shafts; and a pair of third shafts;
  (a) the manifold having at least a manifold inlet port and a manifold outlet port; a top wall; opposing first and second side walls, the first and second side walls each including, passing through the respective first and second side walls: a vertical slot, a horizontal slot, and a first manifold through hole for one of the pair of first shafts for engaging the manifold with the carriage assembly; a rear wall; a guide rod arranged parallel to, and spaced away from, the rear wall;

(b) the carriage assembly including a strut with a front wall arranged at an angle for aligning with an angled extension on the filter capsule housing, and having a top wall, the top wall including a guide rod opening passing through the top wall; a front wall with a cut out for receiving the filter capsule housing; opposing first and second side walls, the first and second side walls each including a vertically arranged member having a vertical slot passing through the vertical member for one of the pair of first shafts for engaging the manifold with the carriage assembly, a vertical member through hole for receiving a second rod for engaging the manifold with the carriage assembly and the pivotable lever, and a shelf with a first shoulder and second shoulder, the shelf being configured to receive, between the first and second shoulders, a protrusion on the filter capsule housing;

(c) the pivotable lever being pivotable between a first position allowing the manifold assembly to receive the filter capsule, and a second position engaging the filter capsule with the manifold assembly such that the filter inlet port and the filter outlet port are moved toward the manifold inlet port and the manifold outlet port; the pivotable lever including a pair of lever arms, each of the pair of lever arms including a first lever through hole for one of the pair of second shafts for engaging the carriage assembly with the manifold and the pivotable lever, and a second lever through hole for one of the pair of third shafts for engaging the manifold with the pivotable lever, the second lever through hole being spaced away from the first lever through hole;

(d) each of the pair of first shafts passing through the respective first manifold through holes and the vertical slots passing through the vertical members of the carriage assembly;

(e) each of the pair of second shafts passing through the respective vertical slots of the manifold, the vertical member through holes of the carriage assembly and the first lever through holes; and (f) each of the pair of third shafts passing through respective second lever through holes and the horizontal slots of the manifold;

wherein first and second conduits pass through the manifold inlet and outlet ports respectively;

moving the carriage assembly and the seated filter capsule from a first position wherein the filter inlet and outlet ports are spaced from the manifold inlet and outlet ports, to a second position wherein the first and second conduits are sealingly engaged with the respective filter inlet and outlet ports;

passing fluid through the first conduit in the manifold inlet port and the filter inlet port through a filter comprising a porous filter in the filter capsule, and passing filtered fluid through the outlet port of the filter capsule and the second conduit in the manifold outlet port.

* * * * *